US006592027B2

(12) United States Patent
Kovlakas

(10) Patent No.: US 6,592,027 B2
(45) Date of Patent: Jul. 15, 2003

(54) METHOD FOR THE RECOVERY OF UNUSABLE PRINTED POSTAGE

(75) Inventor: Paul A. Kovlakas, Milford, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/999,310

(22) Filed: Nov. 15, 2001

(65) Prior Publication Data

US 2003/0089765 A1 May 15, 2003

(51) Int. Cl.[7] ............................................ G06F 17/00

(52) U.S. Cl. ......................... 235/375; 705/60; 705/61; 705/62; 705/401; 705/402; 705/410

(58) Field of Search ............................ 705/60, 61, 62, 705/401, 402, 410; 235/375

(56) References Cited

U.S. PATENT DOCUMENTS

| | | | | |
|---|---|---|---|---|
| 5,454,038 A | * | 9/1995 | Cordery et al. | 705/60 |
| 5,675,650 A | * | 10/1997 | Cordery et al. | 705/60 |
| 5,768,132 A | * | 6/1998 | Cordery et al. | 705/410 |
| 5,929,415 A | | 7/1999 | Berson | 235/382 |
| 6,112,193 A | * | 8/2000 | Dlugos et al. | 705/408 |
| 6,285,990 B1 | * | 9/2001 | Lee et al. | 705/60 |
| 6,415,336 B1 | * | 7/2002 | Sansone | 710/5 |
| 6,427,139 B1 | * | 7/2002 | Pierce | 705/60 |

FOREIGN PATENT DOCUMENTS

| | | | | |
|---|---|---|---|---|
| EP | 1113401 A1 | * | 7/2001 | G07B/17/00 |

* cited by examiner

*Primary Examiner*—Karl D. Frech
*Assistant Examiner*—Daniel Hess
(74) *Attorney, Agent, or Firm*—Ronald Reichman; Angelo N. Chaclas

(57) ABSTRACT

A method for recovering postage for metered mail pieces that have not been posted, the method includes: placing information that uniquely identifies the mail piece in a postal indicia; storing the information that uniquely identifies each metered mail piece at a remote site; requesting a refund for a mail piece that has not been posted; determining if the information in the postal indicia that uniquely identifies the mail piece is the same as the information that uniquely identifies the mail piece that is stored in the remote site; and refunding the postage if the information in the postal indicia that uniquely identifies the mail piece is the same as the information that uniquely identifies the mail piece that is stored in the remote site.

27 Claims, 6 Drawing Sheets

METHOD FOR THE RECOVERY OF UNUSABLE PRINTED POSTAGE

FIELD OF THE INVENTION

The invention relates generally to the field of franking machines and, more particularly, to the return of funds for unusable printed postage.

BACKGROUND OF THE INVENTION

Historically, postage meters have been mechanical and electromechanical devices that maintain, through mechanical or "electronic registers", an account of all postage printed and the remaining balance of prepaid postage; and print postage postmarks (indicia) that are accepted by the postal service as evidence of the prepayment of postage.

Small business, mailers and home mailers currently are able to use their desktop computer and printer to apply postage in the form of an Information-Based Indicia (IBI) directly onto envelopes or labels while applying an address. The IBI consists of a two-dimensional bar code containing hundreds of bytes of information about the mail piece and certain human-readable information. The indicium includes a digital signature to preclude the forgery of indicia by unauthorized parties. The postal security device (PSD) is a unique security device that provides a cryptographic digital signature to the indicium and performs the function of postage meter registers.

The IBI technology of the United States Postal Service offers the postal customer a way to pay for postage without stamps. Envelopes are franked using the postal customer's personal computer, a personal computer compatible add-on, and the customer's printer. The PSD provides postal value storage and the link to the USPS and the manufacturer of the personal computer compatible add-on.

As part of the process of applying postage to a mail piece the postage vault or registers of electronic meters, or the PSD of personal computer meters, is debited for the amount of postage that is due. Sometimes, the mailer decides not to mail the mail piece after postage has been applied to the mail piece, i.e., the mail piece has an incorrect destination address, incorrect recipient information, etc. The mailer also may decide not to mail the mail piece, because the mail piece is not mailable, since the mail piece jammed in the printer, the indicium and/or address was not correctly printed, the flap of the envelope fused to the throat of the envelope before a letter was inserted into the envelope, etc. In all of the above examples, the mailer's meter was debited for the postage that was affixed to the mail piece.

If the mailer wants a refund for the amount that has been debited to their meter they have to physically deliver to the USPS and/or the meter manufacturer the mail pieces having indicia that were not used. The foregoing is costly and time consuming for the mailer as well as the USPS and/or meter manufacturer.

SUMMARY OF THE INVENTION

This invention overcomes the disadvantages of the prior art by providing a method that will easily and automatically recover postage that has been debited to the mailer's meter for mail pieces that are not going to be posted. The foregoing is accomplished by scanning and extracting information from a postage-evidenced mail piece that can be used to uniquely identify a mail piece and validate the postage evidence. This information is then reconciled against centralized or distributed remote logs of postage transactions and tracking information to determine if the mail piece has already been entered into the postal mailstream and protected against fraud. Once it has been verified that the mail piece has valid postage evidence and has not yet been entered into the mailstream, the postage evidence can be voided, and the postage amount can be credited or refunded.

DETAILED DESCRIPTION OF THE PREFERRED EMBODIMENT

Figure 1:
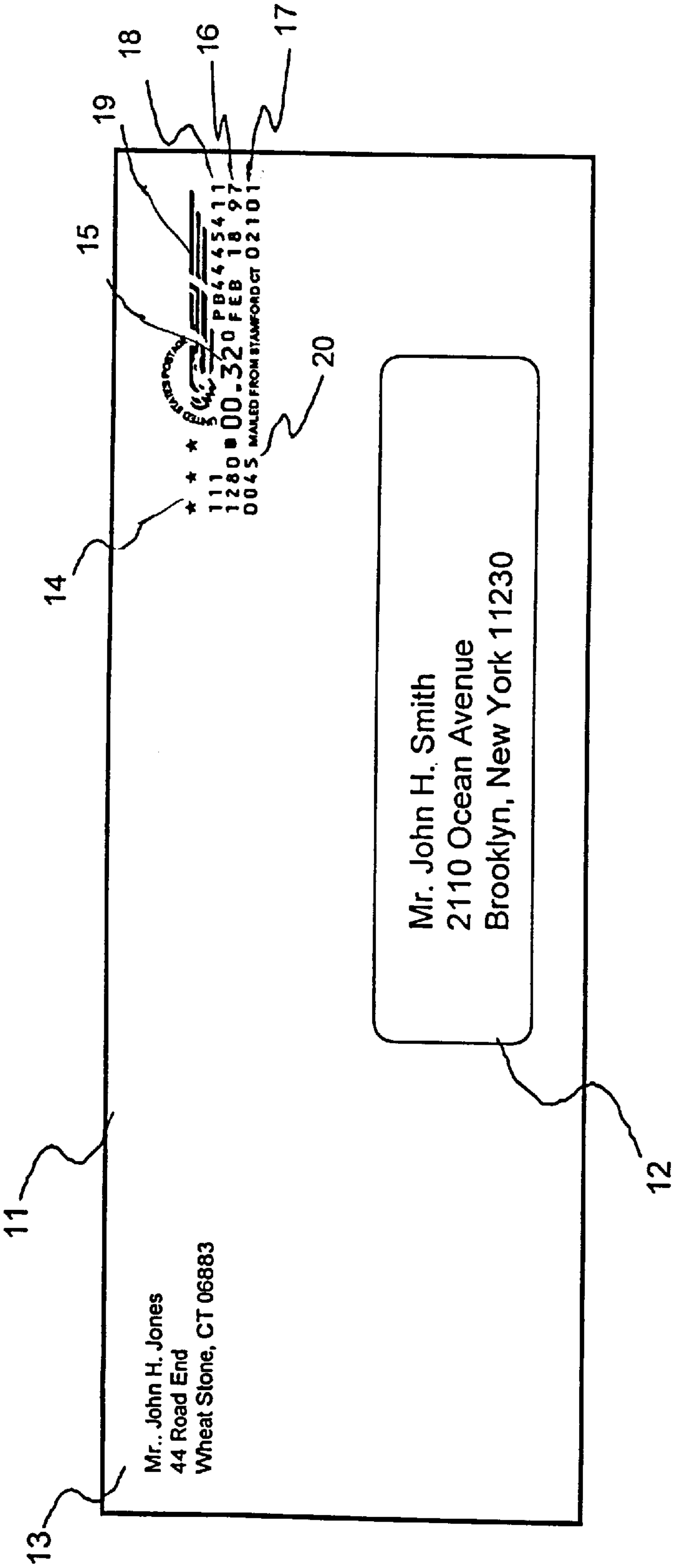
FIG. 1 is a drawing of a mail piece having a indicia produced by an electronic meter.

Referring now to the drawings in detail, and more particularly to FIG. 1, the reference character 11 represents a mail piece that has a recipient address field 12 and a sender address field 13. A postal indicia 14 that was made by an electronic meter is affixed to mail piece 11. Indicia 14 contains a dollar amount 15; the date 16 that postal indicia 14 was affixed to mail piece 11; the place the mail piece was mailed from 17; the postal meter serial number 18; an eagle 19; and, a security code 20. Security code 20 is a unique number that is derived from address field 12 and information contained in the postage meter that affixed indicia 14. The manner in which security code 20 is obtained is disclosed in the Sansone et al U.S. Pat. No. 4,831,555 entitled "Unsecured Postage Applying System" herein incorporated by reference.

Figure 2:
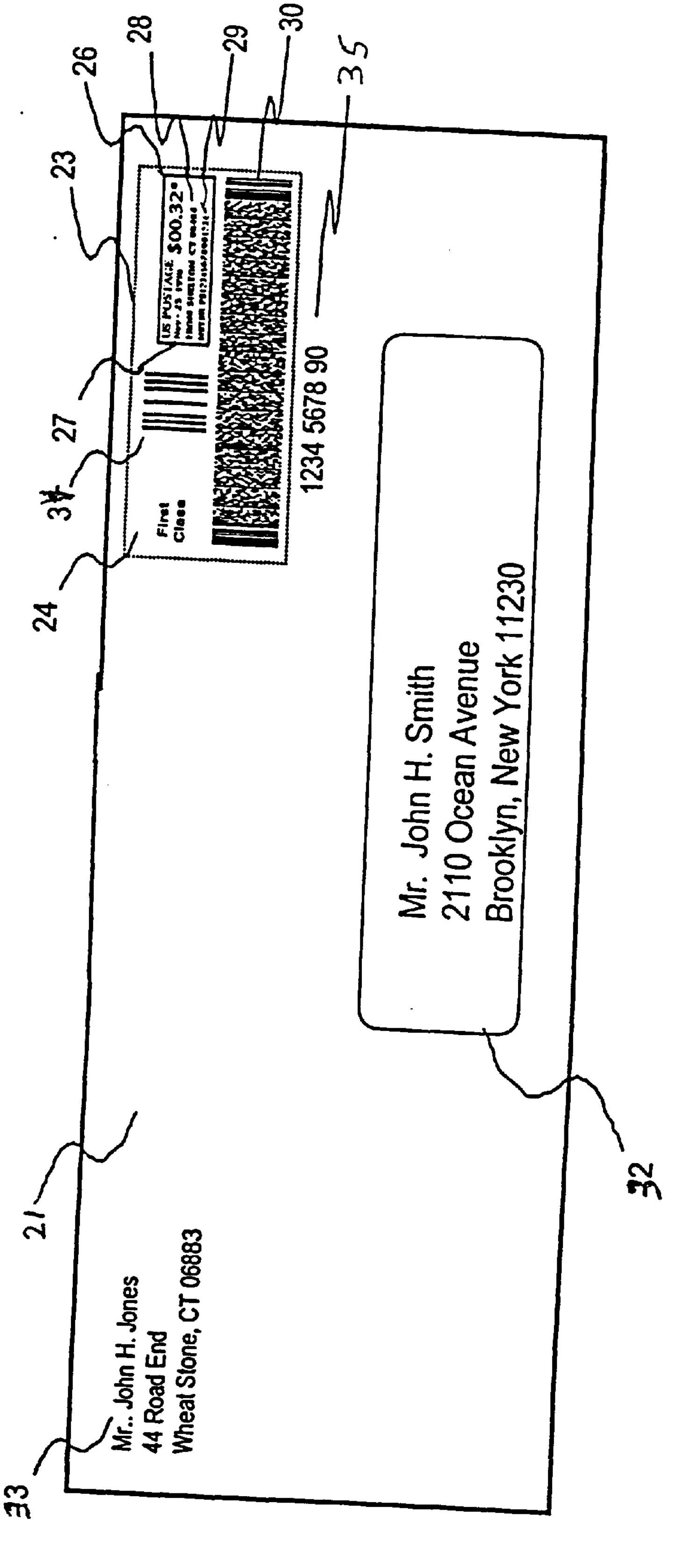
FIG. 2 is a drawing of a mail piece having an Information-Based Indicia produced by a personal computer meter.

FIG. 2 is a drawing of a mail piece having an Information-Based Indicia produced by a personal computer meter. Mail piece 21 has a recipient address field 32 and a sender address field 33. Indicia 24 contains a dollar amount 26, the date 27, that postal indicia 24 was affixed to mail piece 21, the place 28 that mail piece 21 was mailed, the postal meter serial number 29, a two dimensional encrypted bar code 30, a FIM 34 and a security code 35. Security code 35 may be contained within code 30. The manner in which security code 35 is obtained is disclosed in the Sansone et al U.S. Pat. No. 4,831,555 entitled "Unsecured Postage Applying System" herein incorporated by reference.

Figure 3:
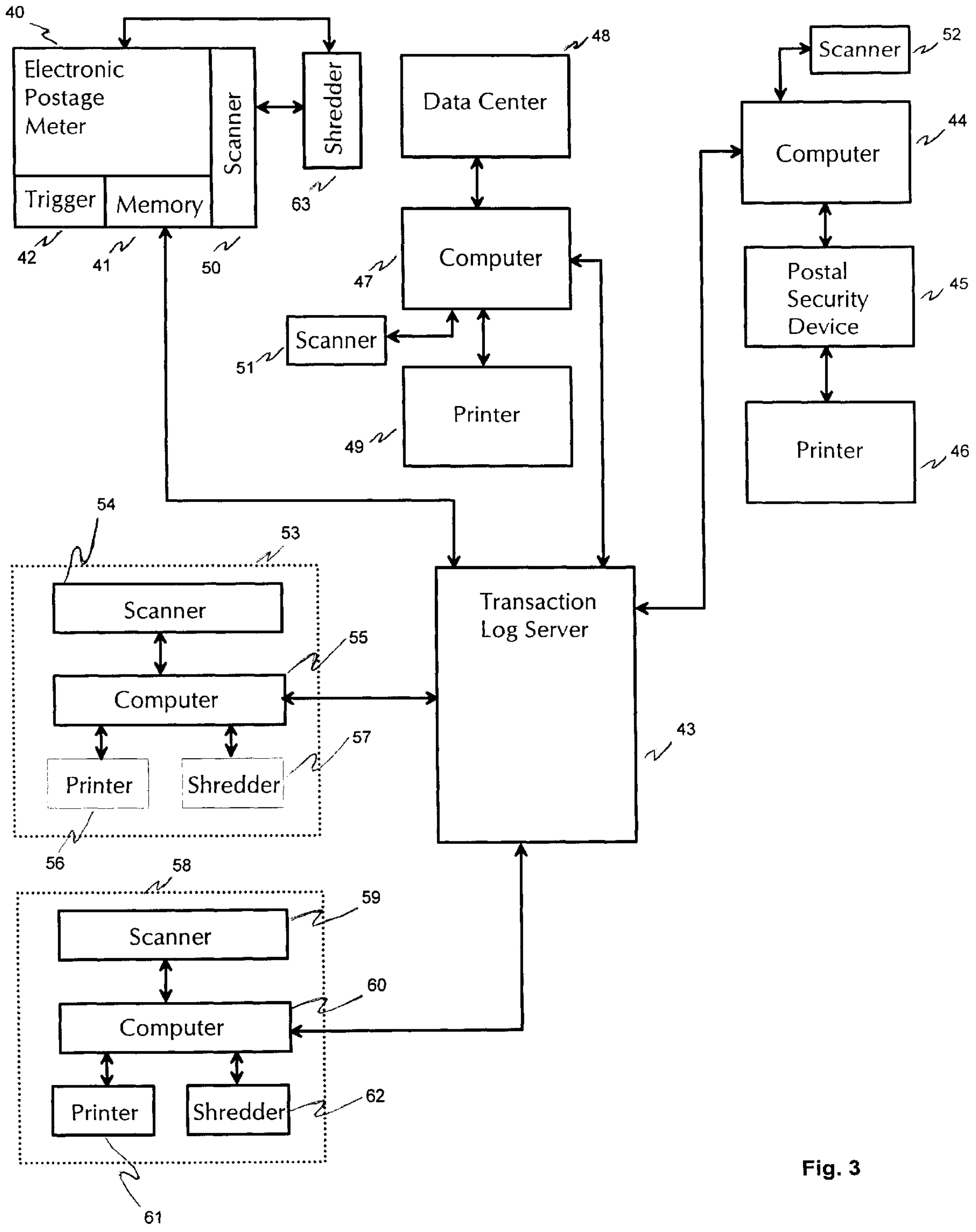
FIG. 3 is a block drawing of a process that is used for the recovery of unusable printed postage.

FIG. 3 is a block drawing of a process that is used for the recovery of unusable printed postage. Electronic postage meter 40 is capable of producing postal indicia 14 of FIG. 1. Meter 40 contains non-volatile memory 41. Memory 41 maintains a transaction log for every indicium 14 that is affixed to a mail piece. Memory 41 will store the date and time that indicia 14 is produced; the amount of postage indicated in indicia 14; the serial number of meter 40 the value of the ascending register of meter 40; and, the value of the descending register of meter 40. At scheduled intervals of time or upon the initiation of a manual trigger 42 from the operator of meter 40, or upon a query from remote transaction log server 43, a copy of the contents of memory 41 is transmitted to and subsequently stored in transaction log server 43. Meter 40 also includes a scanner 50 that is used to scan and read the information on mail piece 11.

Postal indicia 24 (FIG. 2) may be affixed to mail piece 21 by a computer 44 that is coupled to a postal security device 45 and a printer 46. Computer 44 contains a memory that maintains a transaction log for every indicia 24 that is affixed to a mail piece. The memory of computer 44 will store the date and time that indicia 24 is produced; the amount of postage indicated in indicia 24; the serial number of postal security device 45; the value of the ascending register of device 45; and, the value of the descending register of device 45. At scheduled intervals of time or upon the initiation of a trigger from the operator of computer 44, or upon a query from remote transaction log server 43, a copy of the above information in the memory of computer 44 is transmitted to and subsequently stored in transaction log server 43. A scanner 52 is coupled to computer 44 in order to scan and read the information on mail piece 21.

Indicia 24 may also be produced by personal computer 47 that is coupled to data center 48 and printer 49. Computer 47 contains a memory that maintains a transaction log for every indicium 24 that is affixed to a mail piece. The memory of computer 47 will store the date and time that indicia 24 is produced; the amount of postage indicated in indicia 24; the identification number of computer 47 used by data center 48; the value of the ascending register; and, the descending registers of computer 47. At scheduled intervals of time or upon the initiation of a trigger from the operator of computer 47, or upon a query from remote transaction log server 43, a copy of the above information in the memory of computer 47 is transmitted to and subsequently stored in transaction log server 43. A scanner 51 is coupled to computer 47 in order to scan and read the information on mail piece 21.

Refund kiosk 53 includes a scanner 54 that is used to scan the information on mail pieces 11 and 21, a computer 55 that is coupled to scanner 54; a printer 56 (which may be used to void the indicia) that is coupled to computer 55; and, a shredder 57 (which may be used to destroy the mail piece) that is coupled to computer 55. Computer 55 is coupled to transaction log 43. The information scanned from indicia 14 and/or 24 is transmitted to and subsequently stored in transaction log server 43.

Refund device 58 includes a scanner 59 that is used to scan the information on mail pieces 11 and 21; a computer 60 that is coupled to scanner 59; a printer 61 (which may be used to void the indicia) that is coupled to computer 60 and a shredder 62 (which may be used to destroy the mail piece) that is coupled to computer 60. Computer 60 is coupled to transaction log 43. The information scanned from indicia 14 and/or 24 is transmitted to and subsequently stored in transaction log server 43. Device 58 may be located at a United States Postal Service facility or any other location approved by the Postal Service.

When someone did not want to post a mail piece that contained indicia 14 and they wanted a refund for the postage debited to meter 40, they would have scanner 50 scan indicia 14. Meter 40 would check with transaction log server 43 to determine if the information scanned from indicia 14 was reported to log server 43 and the post has not cancelled indicia 14. Log server 43 would credit meter 40 for the value of indicia 14 when the printer in meter 40 (not shown) voided indicia 14, or shredder 63 destroyed the mail piece containing indicia 11.

When someone did not want to post a mail piece that contained indicia 24 and they wanted a refund for the postage debited to postal security device 45 or computer 47, they would have scanner 52 or scanner 51 scan indicia 24. Computer 44 or computer 47 would check with transaction log server 43 to determine if the information scanned from indicia 24 was reported to log server 43, and the post has not cancelled indicia 24. Log server 43 would credit postal security device 45 or computer 47 for the value of indicia 24 when printer 46 or printer 47 voided indicia 24.

Is Refund Kiosk 53 or refund device 58 may also be used to obtain a refund for the postage charged for the production of indicia 14 or indicia 24. Scanner 54 and/or scanner 59 would scan indicia 14 or indicia 24. Computer 55 or computer 60 would check with transaction log server 43 to determine if the information scanned from indicia 24 was reported to log server 43, and the post has not cancelled indicia 14 and/or indicia 24. Log server 43 would credit meter 40, postal security device 45 or computer 47 for the value of indicia 14 and/or indicia 24 when printer 56 or printer 61 voided indicia 14 and/or indicia 24, and/or shredder 57 or shredder 62 destroyed the mail piece containing indicia 14 and/or indicia 24.

Figure 4:
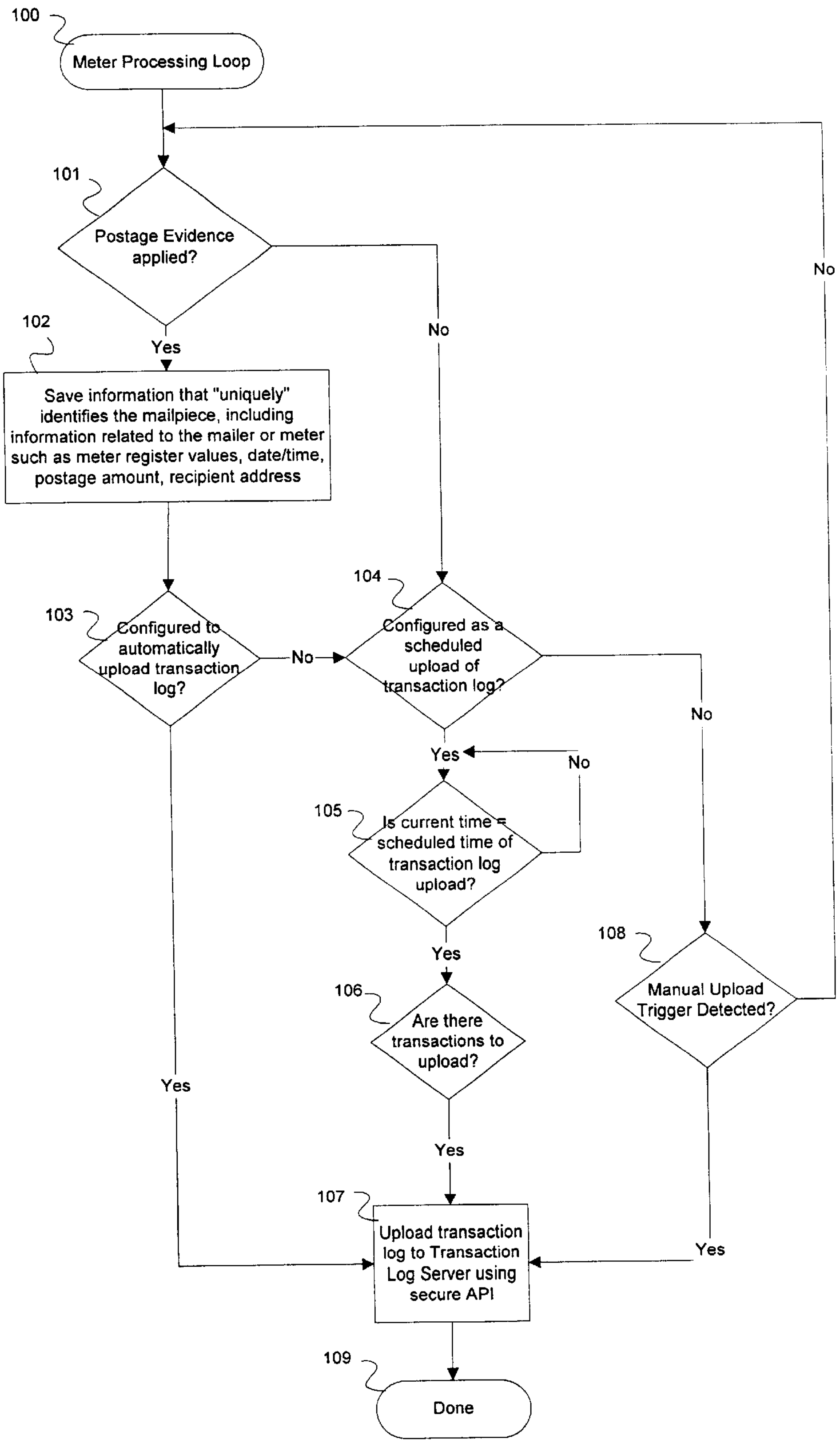
FIG. 4 is a flow chart for the recording and upload transactions of electronic meter 40 of FIG. 3.

FIG. 4 is a flow chart for the recording and upload transactions of electronic meter 40 of FIG. 3. In block 100, the meter processing loop begins. Then the program goes to decision block 101. Block 101 determines whether or not postage evidence, i.e., a valid postal indicia 14, has been affixed to mail piece 11. If block 101 determines that a valid postal indicia was affixed to mail piece 11, the program goes to block 102. Block 102 saves the information that "uniquely" identifies mail piece 11, including information related to the mailer or meter 40 such as the date and time that indicia 14 is produced; the amount of postage indicated in indicia 14; the serial number of meter 40; the value of the ascending register of meter 40; and, the value of the descending register of meter 40 as well as the recipient address of mail piece 11. If block 101 determines that a valid postal indicia was not affixed to mail piece 11, the program goes to decision block 104.

Block 103 determines whether or not meter 40 is configured to automatically upload information from memory 41 to transaction log server 43. If block 103 determines that meter 40 is configured to automatically upload information from memory 41 to transaction log server 43, then the program would go to block 107 to upload the transaction log stored in memory 41 to transaction log server 43 using secure Application Programming Interfaces (API). If block 103 determines that meter 40 is not configured to automatically upload information from memory 41 to transaction log server 43, then the program would go to decision block 104. Block 104 determines whether or not at this time meter 40 is configured to have a scheduled upload to transaction log server 43. If block 104 determines that at this time meter 40 is not configured to have a scheduled upload to transaction log server 43, the program goes to decision block 108. Block 108 determines whether or not a manual upload trigger has been detected, i.e., trigger 42 has been set. If block 108 determines that a manual upload trigger has been detected, the program goes to block 107 to upload the transaction log stored in memory 41 to transaction log server 43 using secure API. If block 108 determines that a manual upload trigger has not been detected, the program goes back to the input of block 101. If block 104 determines that at this time meter 40 is configured to have a scheduled upload to transaction log server 43, the program goes to decision block 105.

Block 105 determines whether or not the current time is equal to the scheduled time of an upload to transaction log server 43 from memory 41. If block 105 determines that the current time is not equal to the scheduled time of an upload to transaction log server 43 from memory 41, the program goes back to the input of decision block 105. If block 105 determines that the current time is equal to the scheduled time of an upload to transaction log server 43 from memory 41, the program goes to block 107 to upload the transaction log stored in memory 41 to transaction log server 43 using secure API. At this point the program goes to block 109 and is done.

Figure 5:
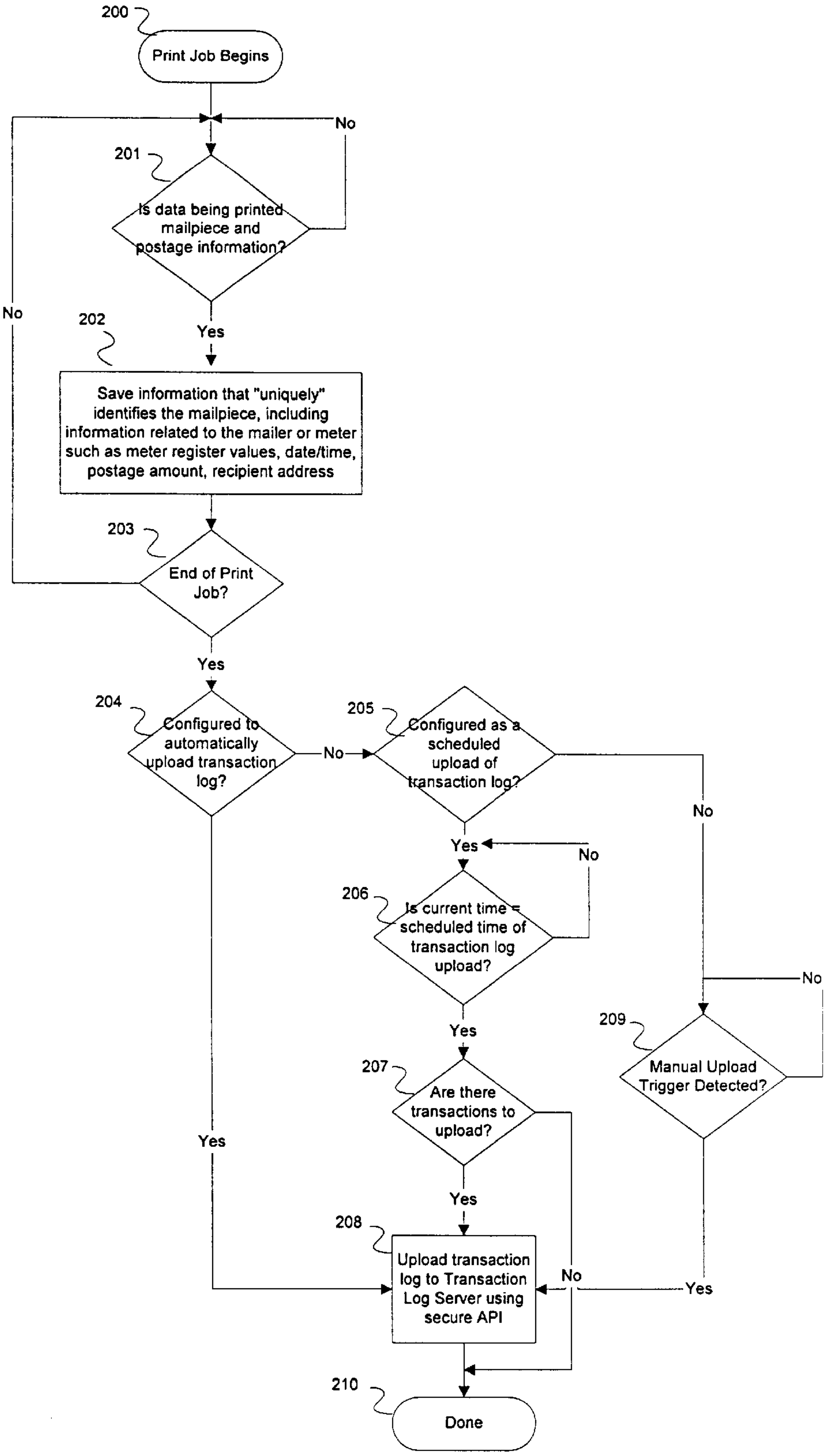
FIG. 5 is a flow chart for the recording and upload transactions of postal security device 45 and computer 47 of FIG. 3.

FIG. 5 is a flow chart for the recording and upload transactions of postal security device 45 and computer 47 of FIG. 3. In block 200 the print job begins, i.e., the printing of mail piece 21 including indicia 24. Then the program goes to decision block 201. Block 201 determines whether or not the print data is mail piece and postage information. If block 201 determines that the print data is not mail piece and postage information, the program goes back to the input of block 201. If block 201 determines that the print data is mail piece and postage information, the program goes to block 202. Block 202 will encrypt and save information that "uniquely" identifies mail piece 21, including information related to the mailer or personal computer meter such as the date and time that indicia 24 is produced; the amount of postage indicated in indicia 24; the serial number of postal security device 45 or the number that data center 48 uses to identify computer 47; the value of the ascending and descending registers as well as the recipient address of mail piece 21. At this point, the program goes to decision block 203. Decision block 203 determines whether or not this is the end of the print job. If block 203 determines that the print job has ended, the program goes back to the input of block 201. If block 203 determines that the print job has not ended, the program goes to the input of decision block 204.

Block 204 determines whether or not postal security device 45 or computer 47 is configured to automatically upload information to transaction log server 43. If block 204 determines that postal security device 45 or computer 47 is configured to automatically upload information to transaction log server 43, then the program would go to block 208 to upload the transaction log stored in postal security device 45 or computer 47 to transaction log server 43 using secure API. If block 204 determines that postal security device 45 or computer 47 is not configured to automatically upload information to transaction log server 43, then the program would go to decision block 205. Block 205 determines whether or not at this time postal security device 45 or computer 47 is configured to have a scheduled upload to transaction log server 43. If block 205 determines that at this time postal security device 45 or computer 47 is not configured to have a scheduled upload to transaction log server 43, the program goes to decision block 209. Block 209 determines whether or not a manual upload trigger has been detected. If block 209 determines that a manual upload trigger has been detected, the program goes to block 208 to upload the transaction log stored in postal security devise 45 or computer 47 to transaction log server 43 using secure API. If block 209 determines that a manual upload trigger has not been detected, the program goes back to the input of block 209. If block 205 determines that at this time postal security device 45 or computer 47 is configured to have a scheduled upload to transaction log server 43, the program goes to decision block 206.

Block 206 determines whether or not the current time is equal to the scheduled time of an upload to transaction log server 43. If block 206 determines that the current time is not equal to the scheduled time of an upload to transaction log server 43, the program goes back to the input of decision block 206. If block 206 determines that the current time is equal to the scheduled time of an upload to transaction log server 43, the program goes to decision block 207. Block 207 determines whether or not there are any transactions to upload. If block 207 determines that there are no transactions to upload, the program goes to done block 210. If block 207 determines that there are transactions to upload, the program goes to block 208 to upload the transaction log stored in postal security device 45 or computer 47 to transaction log server 43 using secure API. At this point, the program goes to block 210 and is done.

Figure 6:
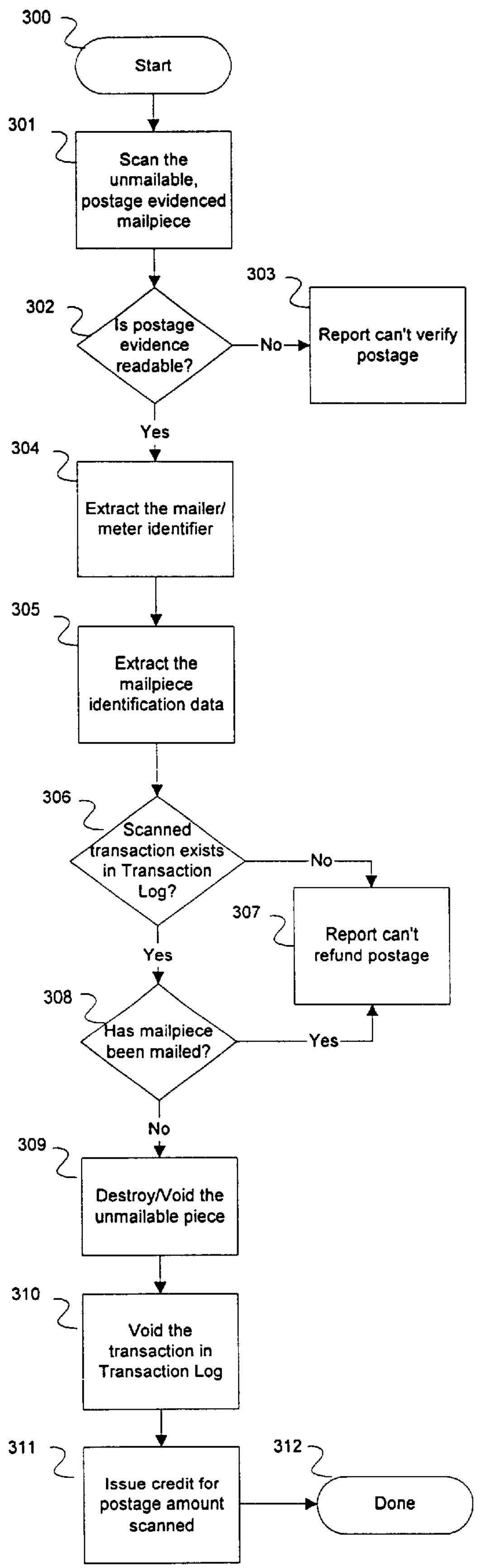
FIG. 6 is a flow chart for the postage recovery processing for refunding funds that have been paid for postal indicia 14 or postal indicia 24 that are not used.

FIG. 6 is a flow chart for the postage recovery processing for refunding funds that have been paid for postal indicia 14 or postal indicia 24 that are not used. The program starts in block 300. Then the program goes to block 301 to scan the postage evidenced mail piece for which someone wants the postage. Now the program goes to decision block 302. Block 302 determines whether or not the postage evidence, i.e., indicia 14 or indicia 24, is readable. If block 302 determines that the postage evidence can not be read, the program goes to block 303 to report that it can not verify the postage. If block 302 determines that the postage evidence can be read, the program goes to block 304 to extract the meter serial number, extract the serial number of postal security device 45 or extract the number that data center 48 uses to identify computer 47.

Now the program goes to block 305 to extract mail piece identification data, i.e., the date and time that indicia 14 or indicia 24 was produced; the amount of postage indicated in indicia 14 and/or indicia 24; and, the value of the ascending and descending registers. Then the program goes to decision block 306. Block 306 determines whether or not the scanned transaction exists in transaction log server 43, i.e., does the information scanned from mail pieces 11 or 21 coincide with information existing in transaction log server 43. If block 306 determines that the scanned transaction does not exist in transaction log server 43, the program goes to block 307 to report that it can not refund the postage. If block 306 determines that the scanned transaction exists in transaction log server 43, the program goes to decision block 308. Block 308 determines whether or not mail piece 11 and/or 21 has been mailed. If block 308 determines that mail piece 11 and/or mail piece 21 has been mailed, the program goes to block 307 to report that it can not refund the postage. If block 308 determines that mail piece 11 and/or mail piece 21 has not been mailed, the program goes to block 309 to destroy or void the mail piece that has a valid postal indicia that was not mailed. Then the program goes to block 310 to void the transaction in transaction log server 43 for the voided or destroyed mail piece. At this point the program goes to block 311 to issue a credit for the amount of postage scanned. Then the program goes to block 312 and is done.

The above specification describes a new and improved method for the recovery of unusable printed postage. It is realized that the above description may indicate to those skilled in the art additional ways in which the principles of this invention may be used without departing from the spirit. Therefore, it is intended that this invention be limited only by the scope of the appended claims.

What is claimed is:

1. A method for recovering postage for metered mail pieces that have not been posted, the method comprising the steps of:

a. placing information that uniquely identifies the mail piece in a postal indicia;

b. storing the information that uniquely identifies each metered mail piece at a remote site;

c. requesting a refund for a mail piece that has not been posted;

d. determining if the information in the postal indicia that uniquely identifies the mail piece is the same as the information that uniquely identifies the mail piece that is stored in the remote site; and e. refunding the postage if the information in the postal indicia that uniquely identifies the mail piece is the same as the information that uniquely identifies the mail piece that is stored in the remote site, wherein the refund may be requested at a remote site from where the postal indicia was produced.

2. The method claimed in claim 1, wherein the postage is not refunded if the information in the postal indicia that uniquely defines the mail piece is not the same as the information that uniquely identifies the mail piece that is stored in the remote server.

3. The method claimed in claim 1, further including the step of:

destroying the mail piece after refunding the funds for the mail piece that has not been posted.

4. The method claimed in claim 1, further including the step of:

voiding the postal indicia after refunding the funds for the mail piece that has not been posted.

5. The method claimed in claim 1, wherein the information that uniquely identifies each mail piece comprises:

a meter serial number; and the date and time the mail piece postal indicia was produced.

6. The method claimed in claim 5, wherein the information that uniquely identifies each mail piece further comprises: the amount of postage represented by the indicia.

7. The method claimed in claim 1, wherein the information that uniquely identifies each mail piece comprises:

postal security device serial number; and the date and time the mail piece postal indicia was produced.

8. The method claimed in claim 7, wherein the information that uniquely identifies each mail piece further comprises: the amount of postage represented by the indicia.

9. The method claimed in claim 1, wherein the information that uniquely identifies each mail piece comprises:

a identification number that identifies the computer that requested the production of the postal indicia; and the date and time the mail piece postal indicia was produced.

10. The method claimed in claim 9, wherein the information that uniquely identifies each mail piece further comprises: the amount of postage represented by the indicia.

11. The method claimed in claim 1, further including the step of:

canceling the stored information at the remote site that uniquely identifies the mail piece for which postage has been refunded.

12. The method claimed in claim 1, wherein the refund may be requested where the postal indicia was produced.

13. The method claimed in claim 1, wherein the refund may be received where the postal indicia was produced.

14. The method claimed in claim 1, wherein the refund may be requested at a remote site from where the postal indicia was produced.

15. A method for recovering postage for metered mail pieces that have not been posted, the method comprising the steps of:

a. placing information that uniquely identifies the mail piece in a postal indicia;

b. storing the information that uniquely identifies each metered mail piece at a remote site;

c. requesting a refund for a mail piece that has not been posted;

d. determining if the information in the postal indicia that uniquely identifies the mail piece is the same as the information that uniquely identifies the mail piece that is stored in the remote site; and e. refunding the postage if the information in the postal indicia that uniquely identifies the mail piece is the same as the information that uniquely identifies the mail piece that is stored in the remote site, wherein the refund may be received at a remote site from where the postal indicia was produced.

16. The method claimed in claim 15, wherein the postage is not refunded if the information in the postal indicia that uniquely defines the mail piece is not the same as the information that uniquely identifies the mail piece that is stored in the remote server.

17. The method claimed in claim 15, further including the step of:

destroying the mail piece after refunding the funds for the mail piece that has not been posted.

18. The method claimed in claim 15, further including the step of:

voiding the postal indicia after refunding the funds for the mail piece that has not been posted.

19. The method claimed in claim 15, wherein the information that uniquely identifies each mail piece comprises:

a meter serial number; and the date and time the mail piece postal indicia was produced.

20. The method claimed in claim 15, wherein the information that uniquely identifies each mail piece further comprises: the amount of postage represented by the indicia.

21. The method claimed in claim 15, wherein the information that uniquely identifies each mail piece comprises:

a postal security device serial number; and the date and time the mail piece postal indicia was produced.

22. The method claimed in claim 21, wherein the information that uniquely identifies each mail piece further comprises: the amount of postage represented by the indicia.

23. The method claimed in claim 15, wherein the information that uniquely identifies each mail piece comprises:

an identification number that identifies the computer that requested the production of the postal indicia; and the date and time the mail piece postal indicia was produced.

24. The method claimed in claim 23, wherein the information that uniquely identifies each mail piece further comprises: the amount of postage represented by the indicia.

25. The method claimed in claim 15, further including the step of:

canceling the stored information at the remote site that uniquely identifies the mail piece for which postage has been refunded.

26. The method claimed in claim 15, wherein the refund may be requested where the postal indicia was produced.

27. The method claimed in claim 15, wherein the refund may be received where the postal indicia was produced.

* * * * *